United States Patent
Strabley

(10) Patent No.: US 7,907,284 B2
(45) Date of Patent: Mar. 15, 2011

(54) ENHANCED SCALE FACTOR RING LASER GYROSCOPE

(75) Inventor: Jennifer S. Strabley, Maple Grove, MN (US)

(73) Assignee: Honeywell International Inc., Morristown, NJ (US)

( * ) Notice: Subject to any disclaimer, the term of this patent is extended or adjusted under 35 U.S.C. 154(b) by 317 days.

(21) Appl. No.: 12/173,777

(22) Filed: Jul. 15, 2008

(65) Prior Publication Data

US 2010/0014091 A1   Jan. 21, 2010

(51) Int. Cl.
    G01C 19/66 (2006.01)
(52) U.S. Cl. ...................................................... 356/469
(58) Field of Classification Search .................. 356/469, 356/459, 463, 471
    See application file for complete search history.

(56) References Cited

U.S. PATENT DOCUMENTS

| | | | |
|---|---|---|---|
| 3,484,169 A | | 12/1969 | Skalski et al. |
| 4,396,290 A | | 8/1983 | Morris |
| 4,495,137 A | * | 1/1985 | Otsubo ........................ 376/171 |
| 4,588,296 A | | 5/1986 | Cahill et al. .................. 356/462 |
| 4,825,260 A | | 4/1989 | Hendow et al. |
| 5,056,920 A | * | 10/1991 | Ahonen et al. ................ 356/469 |
| 5,196,905 A | | 3/1993 | Hahn et al. |
| 5,386,288 A | * | 1/1995 | Martin ........................... 356/467 |
| 5,471,489 A | | 11/1995 | Thorland |
| 5,579,110 A | | 11/1996 | Touchberry et al. |
| 5,818,591 A | * | 10/1998 | Albers et al. .................. 356/469 |
| 5,867,269 A | * | 2/1999 | Albers et al. .................. 356/469 |
| 6,853,667 B2 | * | 2/2005 | Seiber et al. ..................... 372/61 |
| 7,009,211 B2 | | 3/2006 | Eilers et al. |
| 7,058,111 B2 | * | 6/2006 | Seiber ............................. 372/61 |

OTHER PUBLICATIONS

"Neon," Periodic Table by Softciências, accessed on Jul. 3, 2010 at http://nautilus.fis.uc.pt/st2.5/scenes-e/elem/e01093.html.*
UC San Diego, "Hyperfine Splitting," accessed on Sep. 26, 2010 at http://quantummechanics.ucsd.edu/ph130a/130_notes/node358.html.*
UC San Diego, "Hyperfine Splitting in a B Field," accessed on Sep. 26, 2010 at http://quantummechanics.ucsd.edu/ph130a/130_notes/node359.html.*
WebElements: the periodic table on the web, "Isotopes of neon," accessed on Sep. 26, 2010 at http://www.webelements.com/neon/isotopes.html.*
Griffiths, Quantum Mechanics, 2005, Prentis Hall, second edition.*
Amsler, et al., "Quark Model," Jul. 24, 2008, revised Dec. 2007, Phys. Let., B667.*
Ferguson et al., Single-Mode Collapse in 6328-A He-Ne Lasers, Applied Optics, Sep. 15, 1978, pp. 2924-2929, vol. 17, No. 18.
Kormack et al., 2005 36th Meeting of the Division of Atomic, Molecular and Optical Physics, May 20, 2005, Lincoln, Nebraska.
Eliseev, Theory of Nonlinear Sagnac Effect, Opto-Electronics Review, 2008, pp. 38-43, 16, No. 1.

(Continued)

Primary Examiner — Gregory J Toatley
Assistant Examiner — Scott M Richey
(74) Attorney, Agent, or Firm — Fogg & Powers LLC

(57) ABSTRACT

An embodiment of the invention enhances the rotation sensitivity and decreases the dead band width of a standard HeNe ring laser gyroscope (RLG), with the highest enhancement at low rotation rates. The addition of a gas with nuclear spin to the traditional HeNe gain medium is used to create the intracavity gain medium with an anomalous dispersive quality and thus enhanced rotation sensitivity.

7 Claims, 5 Drawing Sheets

OTHER PUBLICATIONS

Shahriar et al., Ultrahigh Enhancement in Absolute and Relative Rotation Sensing Using Fast and Slow Light, Physical Review, Dec. 18, 2006, pp. 1-1 - 1-10, A75, 1.

Pati et al., Demonstration of Tunable Displacement-Measurement-Sensitivity Using Variable Group Index in a Ring Resonator, EECS Department, Northwest University, Evanston, IL.

Pati et al., Tunable-Bandwidth White Light Interferometry Using Anomalous Dispersion in Atomic Vapor: Theory and Experiment, EECS Department, Northwest University, Evanston, IL.

Gauthier et al., Superluminal Light Pulses, Subluminal Information Transmission, Optical Society of America, 2003.

* cited by examiner

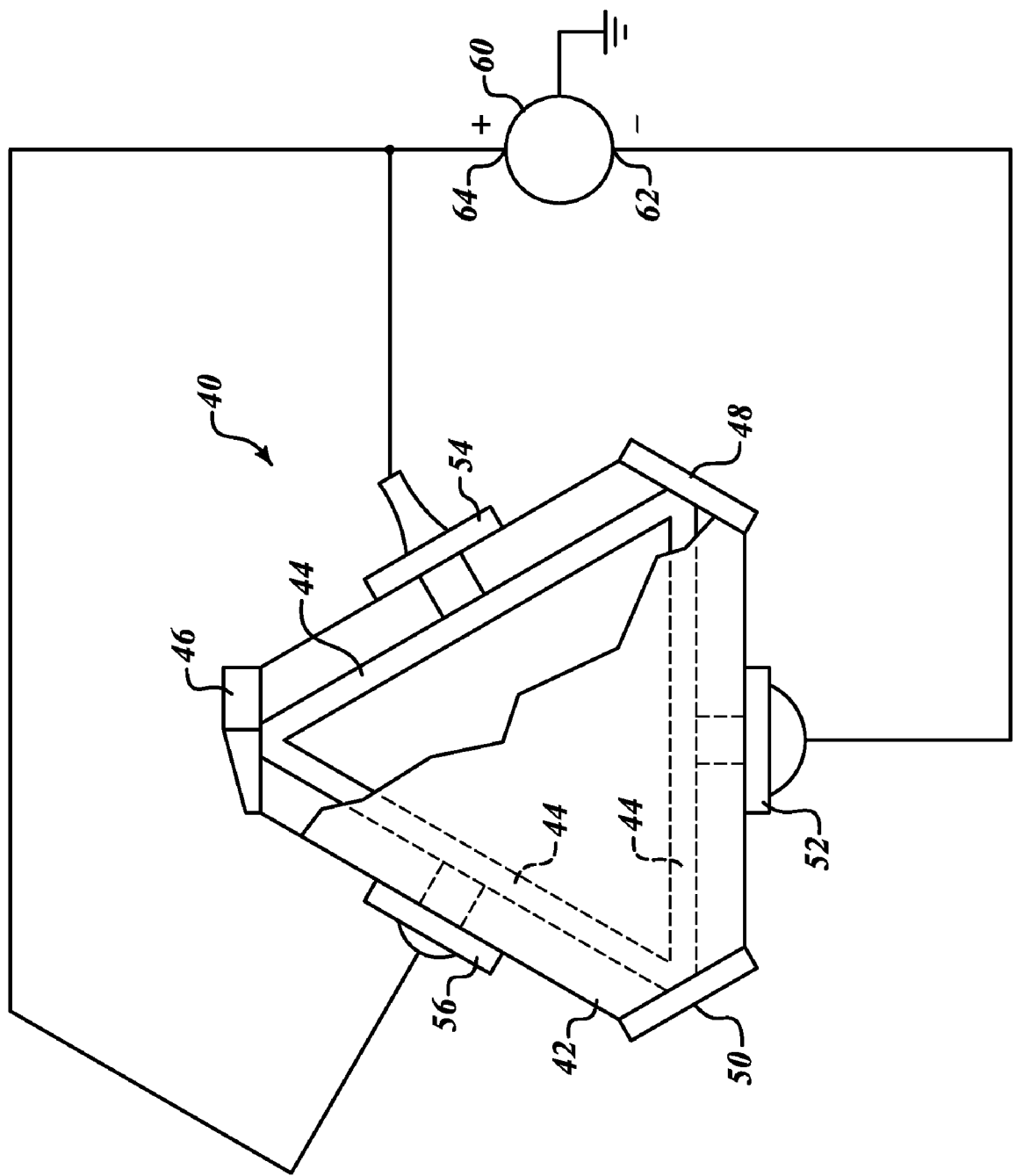

| Transition | Wavelength (nm) | $A_{rk}$ ($10^8 s^{-1}$) | Gain (%/m) |
|---|---|---|---|
| 3s2 → 2p1 | 730.5 | 0.00255 | 1.2 |
| 3s2 → 2p2 | 640.1 | 0.0139 | 4.3 |
| 3s2 → 2p3 | 635.2 | 0.00345 | 1.0 |
| 3s2 → 2p4 | 632.8 | 0.0339 | 10.0 |
| 3s2 → 2p5 | 629.4 | 0.00639 | 1.9 |
| 3s2 → 2p6 | 611.8 | 0.00226 | 1.7 |
| 3s2 → 2p7 | 604.6 | 0.00200 | 0.6 |
| 3s2 → 2p8 | 593.9 | 0.00255 | 0.5 |
| 3s2 → 2p9 | * | | |
| 3s2 → 2p10 | 543.3 | 0.00283 | 0.52 |
| 2s2 → 2p1 | 1523.1 | | |
| 2s2 → 2p2 | 1177.0 | | |
| 2s2 → 2p3 | 1160.5 | | |
| 2s2 → 2p4 | 1152.6 | | |
| 2s2 → 2p5 | 1141.2 | | |
| 2s2 → 2p6 | 1084.7 | | |
| 2s2 → 2p7 | 1062.3 | | |
| 2s2 → 2p8 | 1029.8 | | |
| 2s2 → 2p9 | * | | |
| 2s2 → 2p10 | 886.5 | | |
| 2s3 → 2p2 | 1198.8 | | |
| 2s3 → 2p5 | 1161.7 | | |
| 2s3 → 2p7 | 1080.1 | | |

ENHANCED SCALE FACTOR RING LASER GYROSCOPE

BACKGROUND OF THE INVENTION

The ring laser gyroscope is a navigation instrument which utilizes the Sagnac effect to detect rotations. In a ring laser gyro, resonant properties of a closed cavity convert the Sagnac-induces phase difference between the clock-wise (CW) and counter clock-wise (CCW) propagating beams into a frequency difference, which is more easily measured than the absolute phase shift. This is called resonant frequency splitting. Ring laser gyroscopes may be classified as passive or active, depending upon whether the gain medium is external or internal to the cavity. In the active ring laser gyroscope the cavity defined by the closed optical path becomes an oscillator. Output beams from the two directions interfere to give a beat frequency, which is proportional to the frequency difference between the CCW and CW beams and is a proportional to the rotation rate. The constant of proportionality between the resonant frequency splitting and the rotation rate is the scale factor, which depends on the area enclosed by the ring laser. The oscillator approach has the advantage that the frequency filtering properties of the cavity resonator are narrowed by many orders of magnitude below the passive cavity to give the potential for simple configurations for very precise rotation sensing. To date, the major ring laser gyroscope rotation sensor effort has been put into the active ring laser. Presently most commercially available optical rotation sensors are active ring laser gyroscopes. However, there are undesirable effects operating in any such device such as null shift, lock-in, and mode pulling.

When the rotation rate of the ring laser gyroscope is below a certain absolute threshold, the frequency difference between the CW and CCW beams can no longer be differentiated. This phenomenon is called frequency lock-in, or mode locking. This affects the ring laser gyroscope because at low rotation rates the CW and CCW beams' frequencies can not be differentiated and the ring laser gyroscope produces a false indication that the device is not rotating. If the rotation rate of a ring laser gyroscope starts at a value above that where lock-in occurs and is then decreased, the frequency difference between the beams disappears at a certain rotation rate. This rotation rate is called the lock-in threshold. The range of rotation rates over which lock-in occurs is generally called the dead band of the ring laser gyroscope. Lock-in arises from coupling of light between the clockwise and counter clockwise beams. The coupling results primarily from backscatter off the mirrors that recirculate the beams around the closed path. Backscatter causes the beam in each direction to include a small component having the frequency of the counter propagating beam in the other direction. The lock-in effect in a ring laser gyroscope is similar to the coupling that has long been observed and understood in conventional electronic oscillators. Even with optimum design and high reflectivity mirrors the lock-in phenomenon is invariably present.

Any inability to accurately measure low rotation rates reduces the effectiveness of a ring laser gyroscope in navigational systems. Therefore it is well known that a ring laser gyroscope requires means for circumventing mode locking.

The actual active gain section contains the lasing medium that is the source of the laser radiation. Any such medium is dispersive, that is, its refractive index varies with frequency. Dispersion is classified as normal in frequency regions where the refractive index increases slowly and smoothly with increasing frequency, thus having a positive slope. Typically in a ring laser gyro the refractive index is considered constant. However, in regions near an atomic resonance (gain maximum) the index undergoes a rapid change and there is dispersion, typically accompanied by absorption. When the slope of the dispersion is negative it is called anomalous dispersion.

The source of error in laser gyroscopes is principally because of the effect on gyroscope scale factor. In a ring laser employing a gaseous gain section, anomalous dispersion in the neighborhood of resonances (where the laser operates) causes oscillating modes to be displaced in frequency from their ideal, empty cavity values. The amount of displacement varies with gain, and this mode pulling gives rise to a change in the gyroscope scale factor, that is, in the magnitude of the beat frequency due to rotation. This is a source of error.

Although lock-in cannot be completely eliminated, the problem can be made tractable through deliberate imposition of a known null shift bias. This bias provides a beat frequency in the absence of rotation that is known and that can be subtracted from the rotation readout to obtain the true rotation rate. Null shift biases are generated by several means. Included are discharge gas flow, Langmuir flow, Faraday effect, and mechanical motion of the gyro (dithering).

Dithering involves mechanically oscillating the ring laser gyroscope about its sensor axis so that the device is constantly sweeping through the deadband and is never locked therein. This mechanical oscillation of the ring laser gyroscope is produced by a dither motor attached to the ring laser gyroscope. Dither suspension and drive mechanisms are mechanically complex, and fail to completely eliminate the effects of residual backscatter coupling. Some guidance applications cannot tolerate the amount of mechanical vibration required to mechanically dither the ring laser gyroscope frame.

As shown in FIG. 1, as is known in the art a ring laser gyroscope 10 is typically formed of a block 12 provided with interior passages 14 that communicates with openings at each of its corners. Mirrors 16, 18, and 20 are provided at the corners with one of the mirrors 16, 18, and 20 being used as a read-out device. The interior passages 14 and the mirrors 16, 18, and 20 define a plasma chamber in the form of a closed laser resonant path.

A cathode 22 and anodes 24 and 26 engage corresponding surfaces of the block 12 at openings there through. Indium is usually used to form seals between the block 12 and the electrodes comprising the cathode 22 and the anodes 24 and 26. These seals confine the gas that is energized to provide the laser plasma within the plasma chamber. The energized gas is often referred to as the discharge gas. The Indium seals are compressible so that a tight seal is formed. Also, a dither motor 28 to be discussed below is provided between the block 12 and a support structure.

A source 30 supplies an electric potential across the cathode 22 and the anodes 24 and 26. Typically, the source 30 biases the anodes 24 and 26 at or slightly negative with respect to the potential of the block 12, particularly the potential in the area of the block 12 at the dither motor 28. This potential is a reference potential such as ground. The source 30 biases the cathode 22 at a potential that is more negative than the potential of the anodes 24 and 26.

Accordingly, the invention operates as follows. The electric potential across the cathode 22 and the anode 24 energizes the gas in the interior gain bore passages 14 so as to form a laser plasma that supports a laser which traverses the optical closed loop provided by the interior passages 14 in one direction such as a clockwise direction. Similarly, the electric potential across the cathode 22 and the anode 26 energizes the gas in the interior gain bore passages 14 so as to form a laser plasma that supports a laser which traverses the optical closed loop provided by the interior passages 14 in the opposite direction such as a counterclockwise direction.

One of the problems associated with the ring laser gyroscope 10 is lock-in which occurs at low rotation rates. Backscatter from the mirrors 16, 18, and 20 within the optical path formed by the interior passages 14 couples energy from one of the lasing directions into the counter-propagating laser. While this coupling is always present, at low rotation rates the oscillating frequencies of the two counter-propagating lasers lock together in a single frequency. Thus, a ring laser gyroscope can be insensitive to rotations having low rates. Accordingly, in this embodiment shown, and as described in U.S. Pat. No. 7,058,111, the dither motor 28 is provided in order to dither the ring laser gyroscope 10 because dithering mitigates lock-in.

Recently, it has been theoretically shown that an anomalous dispersion in a resonator based Sagnac gyroscope can enhance the rotation sensitivity by orders of magnitude. In a theoretical discussion and a subsequent experimental system Shahriar et al. (2007) described how the enhancement occurs if the dispersion is anomalous, characteristic of superluminal light propagation. Under their idealized model a group index varied linearly over all frequencies, and the enhancement factor is given by the inverse of the group index, was maximal when the group index was null, corresponding to the so-called critically anomalous dispersion condition (i.e. where the group velocity become infinite). For a realistic medium, the anomalous dispersion does have a limited bandwidth, but even taking this into account, Shahriar et al suggested that the intracavity medium could be manipulated such that a very large enhancement could be achieved, for example, as high as $10^6$.

Accordingly the experimental system of Shahriar et al. described potential ultrahigh enhancement in a gyro system using Rubidium ($^{85}$Rb) to produce bi-frequency gain splitting by optically pumping an intercavity vapor to produce a population inversion between the F=2 and 3 hyperfine states. Bi-frequency gain is a method for producing anomalous dispersion absent absorption of the optical beams. In general, they described how a propagation medium, in their experimental system $^{85}$Rb, was used to enhance the sensitivity of measuring absolute rotations.

In the experiments above, two pump beams of slightly different frequencies were used to generate closely spaced gain peaks, called a gain doublet, in order to produce anomalous dispersion. While this is not the only means for creating anomalous dispersion, this scheme is preferable to other means for generating anomalous dispersion because there is little or no absorption of the transient light. One beam is frequency-locked to the 5S1/2, F=2 to 5P3/2, F'=3 transition in $^{85}$Rb and orthogonally polarized with respect to the probe beam. The two pump beams and the probe are combined using two beam splitters, one polarizing, and the other non-polarizing at the input end, and made to propagate collinearly in Rb vapor cell that contains a mixture of the 85 and 87 isotopes.

A practical implementation of a RLG is to use a HeNe gas mixture as the lasing medium. Historically a mixture of Ne-20 and Ne-22 is used to eliminate mode competition between the CCW and CW beams, as is demonstrated, for example in U.S. Pat. No. 7,058,111. Importantly, although Shahriar et al. demonstrated that $^{85}$Rb works well in proof-of-concept experiment, these results are not translatable for use in a real gyro.

SUMMARY OF THE INVENTION

An embodiment of the invention enhances the rotation sensitivity by increasing the scale factor, lowers the lock-in threshold, and decreases the dead band width of a standard HeNe ring laser gyroscope (RLG), with the highest enhancement at low rotation angles. A novel mixture of Neon isotopes is used to create the intracavity gain medium with gain splitting potentiality. The addition of Ne-21 creates the anomalous dispersive quality and thus enhances activity.

The present invention comprises a method for using anomalous dispersion to enhance the RLG scale factor introducing a combination of Ne-21, Ne-20 and Ne-22 into the cavity of the ring laser gyroscope.

BRIEF DESCRIPTION OF THE DRAWINGS

Preferred and alternative examples of the present invention are described in detail below with reference to the following drawings:

FIG. 2 shows a top view of a ring laser gyroscope of the present invention;

FIGS. 3-1 through 3-4 are schematic representations of normal gain splitting in a standard He—Ne laser and gain splitting created by the introduction of a magnetic field, hyperfine splitting, and/or any other method of splitting Neon energy levels;

FIG. 4-1 is a graphic demonstration of the typical lasing lines in Neon and the corresponding chart of the transitions and lasing wavelengths; and FIG. 4-2 is a chart corresponding to the transitions and lasing wavelengths of Neon as in the embodiment shown in FIG. 4-1.

DETAILED DESCRIPTION OF THE INVENTION

An embodiment of the invention introduces a mixture of Ne-21 and naturally occurring gases Ne-20 and Ne-22 to generate the bi-frequency gain into the gain bore. Ne-21, unlike Ne-20 and Ne-22 has nuclear spin, therefore its energy levels have hyperfine splitting, due to the coupling of the nuclear spin with the electron spin and angular momentum. This hyperfine splitting can split the gain peaks and provide the necessary condition for anomalous dispersion absent absorption. The hyperfine splitting provides a stable separation between the gain peaks that is both independent of temperature and vibration, and therefore the resulting dispersive slope is also very stable, in-turn producing a stable gyro scale factor. This potential means for producing the necessary conditions is manufacturing-friendly and should be able to make use of the RLG in its present form. Ne-21 is non-radioactive.

In general the anomalous dispersion results when the refractive index verses the frequency has a negative slope. This condition can be created (absent absorption) by creating bi-frequency gain peaks in the medium. Via the Kramer-Kronig relationship, the frequency regime between the gain peaks would have anomalous dispersion and the steep index grating would cause enhanced resonate frequency splitting under rotation.

Figure 1:
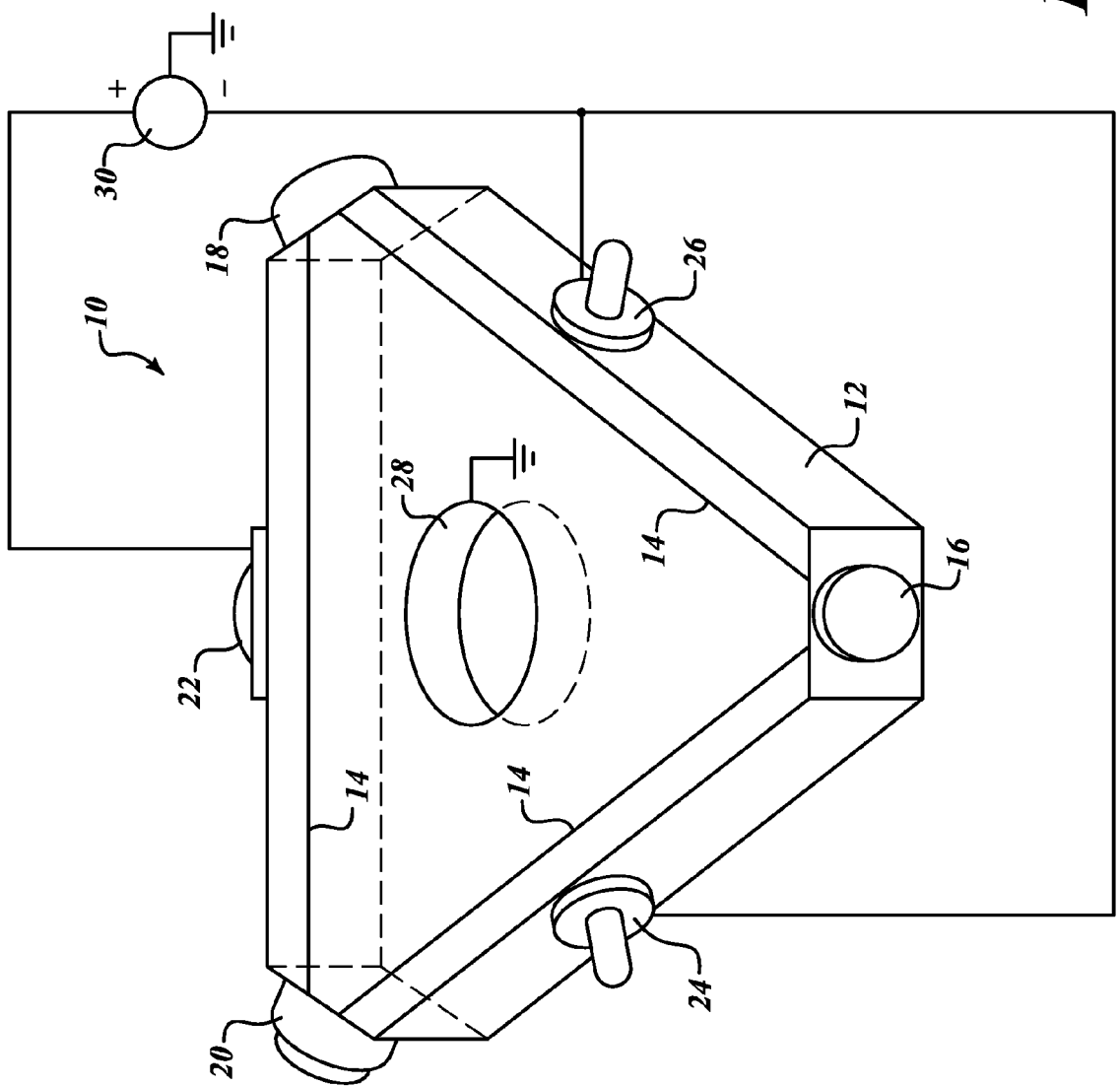
FIG. 1 shows a top view of a ring laser gyroscope of the prior art.
Figure 3:
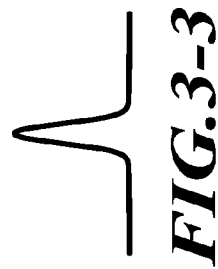
Figures 3, 4:

It has been experimentally demonstrated by Ferguson and Morris (1978) that a HeNe laser in a magnetic field has a split gain profile graphically depicted FIG. 3-4. When lasing the population of the metastable Ne state experiences gain as shown in FIG. 3-1. When the metastable state is split due to hyperfine interaction (subject of this invention) or magnetic field (demonstrated), the gain profiles splits in frequency analogous to the frequency difference between the split energy levels (graphically depicted depicted in FIG. 3- 2). Using the Kramers-Kronig relationship, no matter the mechanism for the gain splitting, the frequency range between the peaks will exhibit anomalous dispersion. See FIG. 3-1 showing the HeNe lasing mechanism in a single isotope with no nuclear spin compared to FIG. 3-2, an example of a HeNe laser with a single isotope with, for example, nuclear spin. It is important to note however, that while similar results are achieved using either a magnetic field or a gain isotope with nuclear spin, the gyro scale factor is much more stable using the nuclear spin to produce the gain peaks. If a magnetic field is used, the frequency splitting will change as the local magnetic field changes. As a consequence, the change in magnetic field would change the dispersive slope and hence the scale factor, requiring magnetic field shielding to stabilize the scale factor. The excess magnetic field shielding needed to make the scale factor stable adds both weight and size to the gyro design, a problem eliminated in the instant invention.

Figures 2, 3:
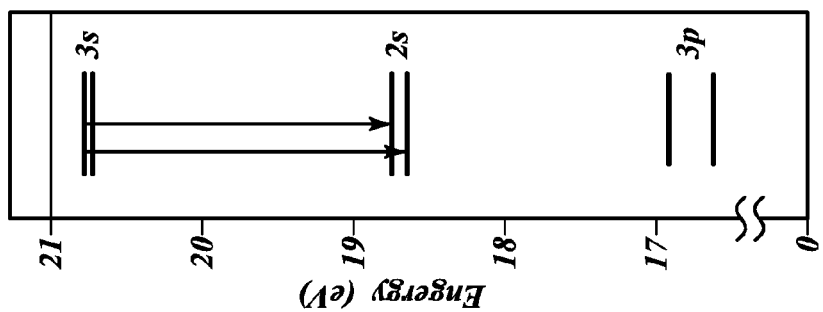
Figures 1, 3:
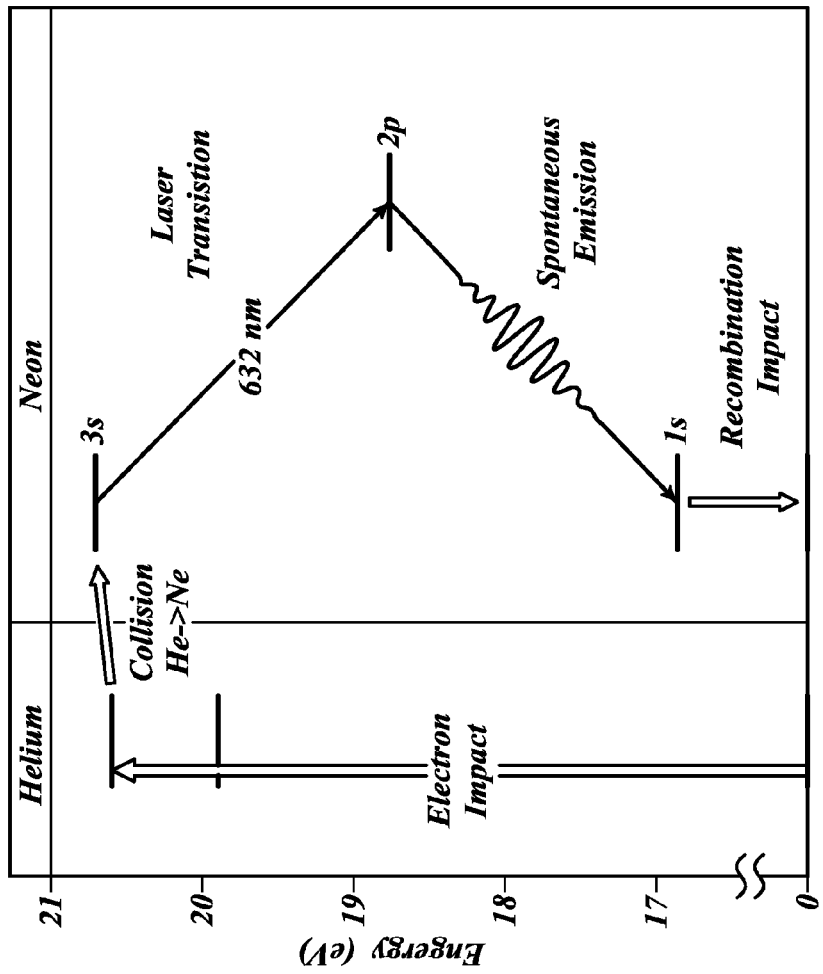
Figures 1, 2, 4:
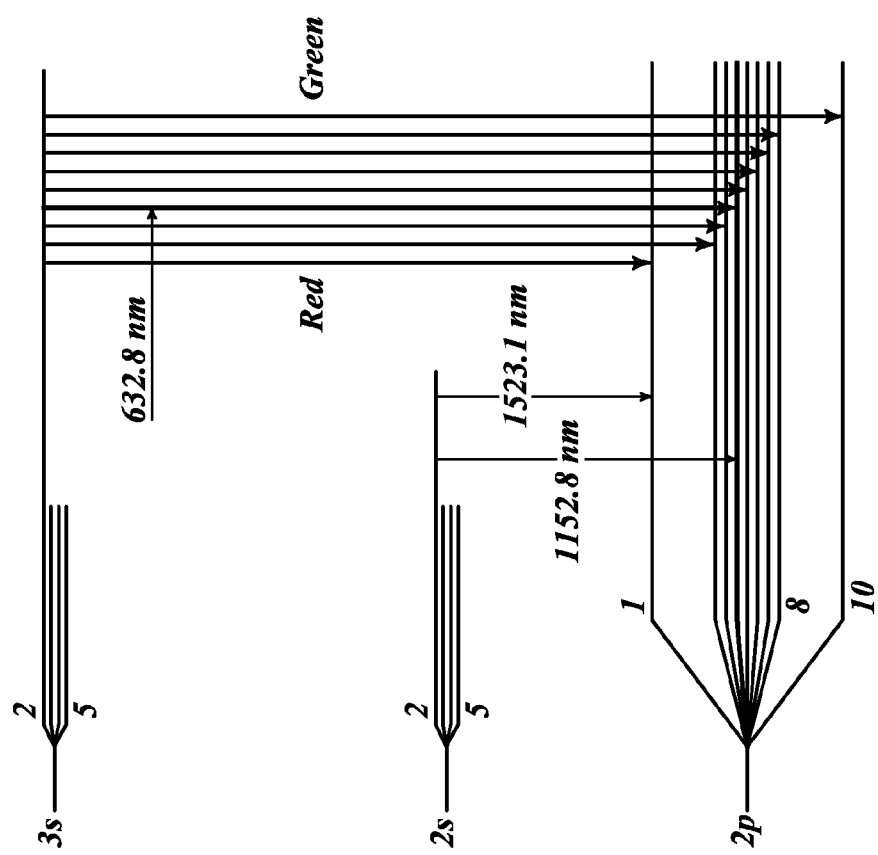

According to an embodiment of the invention, FIG. 2 illustrates a ring laser gyroscope 40 having a block 42 in which interior passages 44 are formed. Mirrors 46, 48, and 50 are provided at the corners with one of the mirrors 46, 48, and 50 being used as a read-out device. The interior passages 44 and the mirrors 46, 48, and 50 define a plasma chamber in the form of a closed laser resonant path. An embodiment of the present invention includes a nuclear spin gas, for example Ne-21, with other lasing gases in the plasma chamber to enhance the sensitivity of the ring laser gyroscope (RLG) at low rotation rates.

Electrodes (a cathode 52 and an anode 54 and 56) engage corresponding surfaces of the block 42 at openings there through. Seals are provided between the block 42 and the cathode 52 and the anodes 54 and 56 in order to confine the gas that is energized to provide a laser plasma within the plasma chamber.

A source 60 maintains anodes 54 and 56 positive with respect to a reference (e.g., ground) potential and to maintain the cathode 52 negative with respect to the reference potential. For example, the source 60 maintains each of the anodes 54 and 56 at +200 volts and maintains the cathode 52 at −250 volts.

The ring laser gyro 40 of an embodiment of the present invention is a Helium-Neon RLGs. The interior passage 44 is filled with the lasing gain medium, and in a preferred embodiment of the present invention, contains a mixture of Ne-21, Ne-22, and Ne-20 gases.

Figure 5:
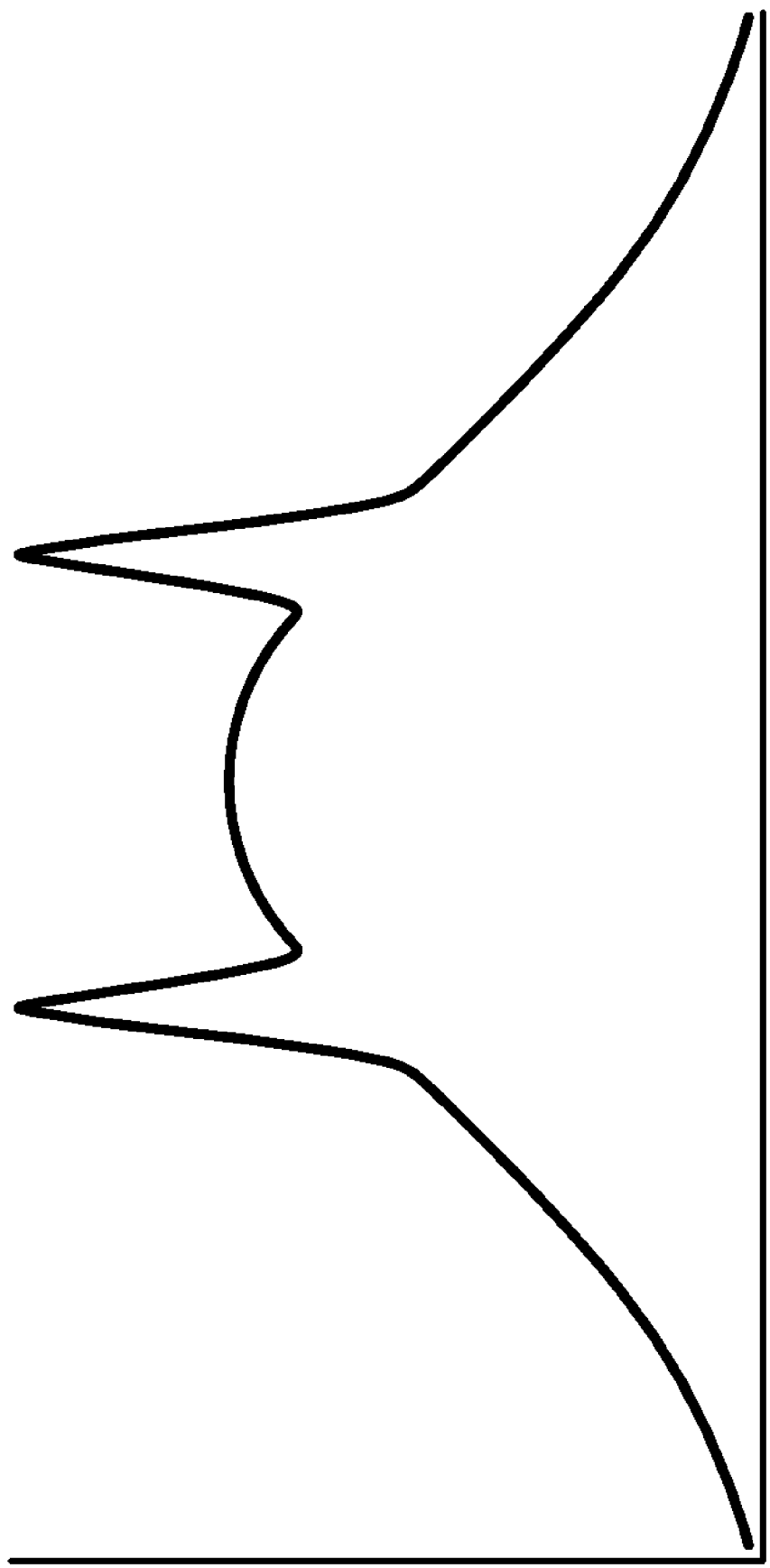
FIG. 5 is a graphic representation of potential gain splitting generated by the introduction of a magnetic field and/or nuclear spin gas Ne-21 into the lazing medium as a function of frequency.

The present invention induces an anomalous dispersion (FIG. 5) based on the nuclear spin of the Ne-21, a non-radioactive Neon isotope. In the HeNe RLG of the prior art, the lasing gas comprises Ne-20 and Ne-22, both stable isotopes with no nuclear spin, and as a consequence there is no hyperfine coupling and the lasing gas has a single Is ground state and a 2p4 meta-stable state. Additional 2p states are separated by several nanometers (nm); sufficient that we can consider the 2p4 state to be isolated (FIG. 4-1 and FIG. 4-2). The Ne-20 and Ne-22 electrons emit energy and fall into the single 2p4 metastable state as shown in FIG. 3-1. The gain into this state is represented by a single Gaussian curve FIG. 3-3 (also, FIG. 4-1 and 4-2 demonstrating 3s2 to 2p4 transitions as the center of Gaussian curve).

With the addition of Ne-21, a stable isotope of Ne, the nuclear spin and the electron spin of an atom couples, i.e. hyperfine coupling, creating dual gain peaks (FIG. 5) where photons emit in two hyperfine split states creating the conditions for anomalous dispersion of frequencies in the bandwidth between the dual gain peaks (i.e. for frequencies less that the hyperfine splitting). These dual gain peaks will be in addition to the typical gain seen with a HeNe laser using Ne-20 and Ne-22 as the gain medium. Therefore, similar to the bi-frequency gain splitting seen in the aforementioned magnetic field and as exemplified in general in FIGS. 3-2 and 3-4, an anomalous dispersion is created purely with nuclear spin of the Ne-21 atom.

Currently, despite the high reflectivity of the mirrors there is still some backscatter of light off the mirrors into the wrong direction in the RLG, and the beat-note calculation doesn't work, thereby creating lock-in at low rotation rates; the RLG may be rotating but the rotation rate cannot be measured because the two frequency splitting between the clockwise and counterclockwise light cannot be distinguished. Presently, prior art RLG mechanically manipulate the frequency of light, i.e. the frequency of the light is mechanically dithered to deal with the lock-in affect. However, in an embodiment of the present invention, this anomalous dispersion has a nonlinear scale factor enhancement: at low rotation rates (and thus low resonant frequency splittings between the clockwise and counterclockwise beams) the scale factor enhancement is the largest and at large rotation rates (and thus large resonant frequency splittings between the clockwise and counterclockwise beams) the scale factor enhancement approaches unity. For example, in the present invention because of the enhancement of the scale factor by the anomalous dispersion, the RLG can detect rotation at low frequencies without mechanical biasing by dithering the light frequencies in the RLG. In effect, the mixture of the radioactive lasing gas Ne-21 creates an anomalous dispersion pushing the lock-in frequency down to a minimal level thus eliminating the necessity of the dither motor 28 (FIG. 1). As illustrated in FIG. 2 the ring laser gyro of the present invention eliminates the dither motor 28 of the prior art. It is expected that this enhancement will greatly increase the gyro scale factor for low rotations and removing the dither will improve the angle-random walk performance of the gyro.

While the preferred embodiment of the invention has been illustrated and described, as noted above, many changes can be made without departing from the spirit and scope of the invention. For example, other mixtures of lasing gases and isotopes are contemplated, and the percentage mixture of gases can vary without departure from the spirit of the invention. For example, almost every element has an isotope that has nuclear spin, and could be used as the lasing gas medium. Additionally, helium could potentially be eliminated in the present invention, and a pure Neon gas combination could be used. Other inert gases such as, but not limited, to Krypton or Argon, and Xenon can be used in RLG.

The embodiments of the invention in which an exclusive property or privilege is claimed are defined as follows:

1. A ring laser gyroscope comprising:
   a ring laser gyro block having an interior gain bore passage within the ring laser gyro block having a plurality of sides and a plurality of ends and containing gain medium wherein the gain medium includes a gas element having non-zero nuclear spin such that the gas element provides anomalous dispersion and bi-frequency gain splitting;
   a plurality of mirrors positioned at the ends of the interior gain bore passage to allow laser beams to reflect and perform the ring lasing operation around some area enclosed; and
   a plurality of electrodes positioned at the sides of the ring laser gyro block for generating counterpropagating laser beams within the interior gain bore passage in which a current flows through the electrodes to the interior gain bore.

2. The gyroscope of claim 1, wherein the gain medium comprises a mixture of Ne-21, Ne-22 and Ne-20.

3. The gyroscope of claim 1, wherein the gas element having non-zero nuclear spin comprises Ne-21.

4. A ring laser gyroscope with an interior gain bore that defines a closed optical path and a gain medium therein, the gyroscope comprising:
  means for producing lasing modes in the interior gain bore such that the gain medium comprises an amount of a gas element having non-zero nuclear spin such that the gas element provides a corresponding anomalous dispersion and bi-frequency gain splitting.

5. The gyroscope of claim 4, wherein the gain medium comprises a mixture of Ne-21, Ne-22 and Ne-20.

6. A method for sensing rotations with a ring laser gyroscope that includes an interior gain bore that defines a closed optical path and a gain medium therein, the method comprising:
  producing lasing modes in the interior gain bore, wherein the gain medium comprises a gas element having non-zero nuclear spin which provides an anomalous dispersion and bi-frequency gain splitting.

7. The method of claim 6 wherein the gain medium comprises a mixture of Ne-21, Ne-22 and Ne-20.

* * * * *